United States Patent
Keibel et al.

(10) Patent No.: US 9,067,322 B2
(45) Date of Patent: Jun. 30, 2015

(54) METHOD AND APPARATUS FOR DRIVING A ROBOT ARRANGEMENT

(75) Inventors: Andreas Keibel, Ausgburg (DE); Thomas Kohler, Gersthofen (DE)

(73) Assignee: KUKA Roboter GmbH, Augsburg (DE)

( * ) Notice: Subject to any disclaimer, the term of this patent is extended or adjusted under 35 U.S.C. 154(b) by 471 days.

(21) Appl. No.: 13/446,356

(22) Filed: Apr. 13, 2012

(65) Prior Publication Data
US 2012/0265338 A1     Oct. 18, 2012

(30) Foreign Application Priority Data
Apr. 18, 2011 (DE) .......................... 10 2011 017 398

(51) Int. Cl.
*G06F 19/00* (2011.01)
*B25J 9/16* (2006.01)

(52) U.S. Cl.
CPC ..... *B25J 9/1674* (2013.01); *G05B 2219/33309* (2013.01); *G05B 2219/33312* (2013.01); *G05B 2219/33313* (2013.01); *G05B 2219/40526* (2013.01)

(58) Field of Classification Search
CPC ................... B25J 9/1674; G05B 2219/33309; G05B 2219/40526; G05B 2219/33313; G05B 2219/33312
See application file for complete search history.

(56) References Cited

U.S. PATENT DOCUMENTS

| | | | | |
|---|---|---|---|---|
| 5,566,275 A | * | 10/1996 | Kano | 700/246 |
| 6,360,143 B1 | * | 3/2002 | Yanagita | 700/245 |
| 6,455,807 B1 | * | 9/2002 | Scott | 219/121.72 |
| 6,999,841 B1 | * | 2/2006 | Rutkowski | 700/181 |
| 7,076,311 B2 | * | 7/2006 | Schuster | 700/21 |
| 2001/0023861 A1 | * | 9/2001 | Karube et al. | 219/121.76 |
| 2010/0145512 A1 | * | 6/2010 | Flessas | 700/245 |
| 2010/0256793 A1 | * | 10/2010 | Lee et al. | 700/108 |
| 2011/0022407 A1 | * | 1/2011 | Bewig et al. | 705/2 |
| 2012/0234803 A1 | * | 9/2012 | Liu et al. | 219/121.54 |

FOREIGN PATENT DOCUMENTS

| | | |
|---|---|---|
| DE | 195 33 604 A1 | 3/1997 |
| DE | 196 14 128 A1 | 10/1997 |
| DE | 198 21 873 A1 | 11/1999 |
| DE | 199 59 330 A1 | 6/2001 |
| DE | 103 00 605 A1 | 2/2004 |
| DE | 103 0 605 A1 | 2/2004 |
| DE | 10300605 A1 * | 2/2004 |
| DE | 10 2008 007 438 A1 | 8/2009 |
| EP | 1136192 A2 * | 9/2001 |
| EP | 1 756 682 B1 | 2/2007 |
| GB | 2 327 512 A | 1/1999 |

* cited by examiner

*Primary Examiner* — Khoi Tran
*Assistant Examiner* — Robert Nguyen
(74) *Attorney, Agent, or Firm* — Wood, Herron & Evans, LLP

(57) ABSTRACT

An invention-based method for controlling a robot arrangement having at least one robot (R) and comprising the following steps:
  Establishing at least one general fault model (1) for a group of different treatment processes with predetermined processing errors (S1);
  Configuring the fault model for at least one specific processing error of a process of the group (S2); and
  Transmitting the configured fault model (1') to a control system of the robot arrangement.

14 Claims, 1 Drawing Sheet

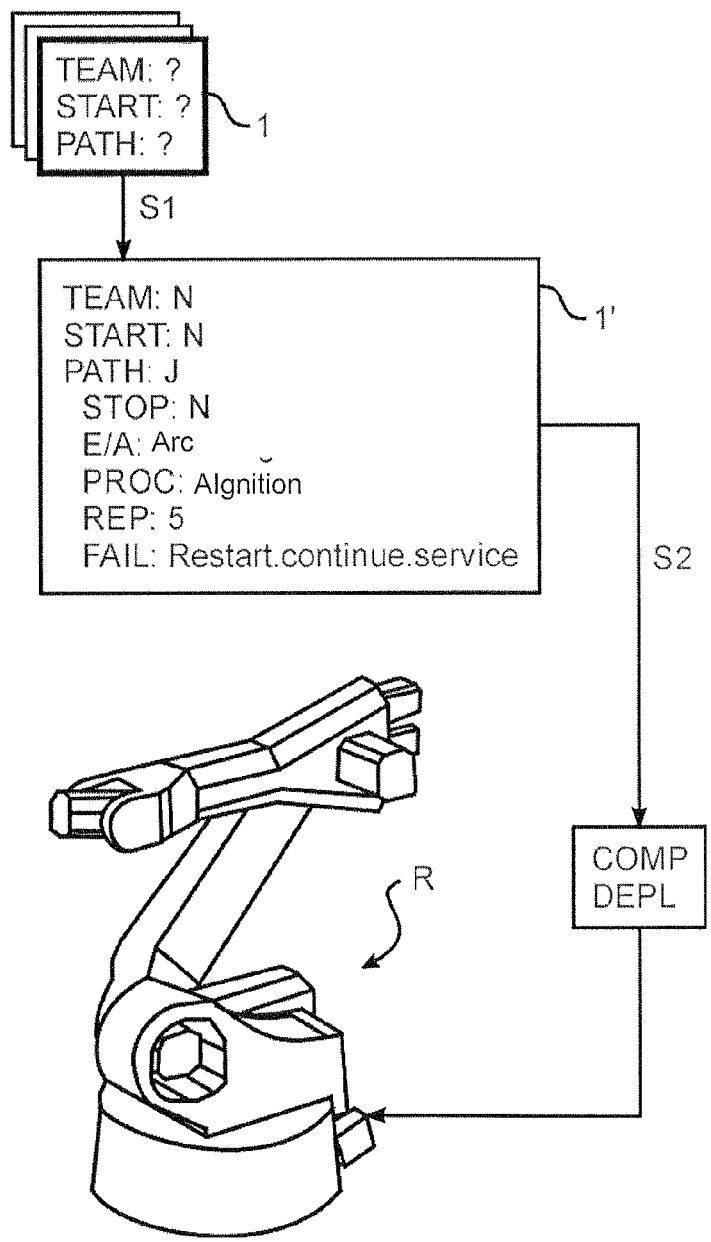

METHOD AND APPARATUS FOR DRIVING A ROBOT ARRANGEMENT

The present invention concerns a method for controlling a robot arrangement having at least one robot as well as means for performing such a method.

In different robot-based methods of processing components, for example welding, gluing, painting, machining, and the like, different processing errors can occur, especially malfunctions of robot-controlled tools such as welding guns, glue or spray guns, drills. For example, one can run out of a supply of welding wire, adhesive or varnish, a welding arc could be interrupted, a glue or spray paint nozzle could be clogged, a drill could break off or become dull.

Until now specific error routines are prepared individually for the different treatment processes and their potential processing errors. This requires expert knowledge and is quite costly because of the individually required specific regeneration. In the various processes completely different error routines are developed for similar error types, without using synergistically available routines.

The present invention has the objective of better controlling a robot arrangement in the event of a processing error.

This objective is achieved by a method having the characteristics of claim 1. Claim 12 protects a means for performing an invention-based method, the sub-claims concern advantageous embodiments of the invention. Means in the sense of the present invention can be based on hardware and/or software technology, especially as calculation equipment prepared for performing an invention-based method, as a program, especially a program module performing an invention-based method when it is implemented in calculation equipment, and/or as storage medium, especially data storage medium having such a program (module).

One aspect of the invention is based on the idea of preparing a general fault model which is appropriate for a plurality of different or diversified treatment processes, especially robot-based welding, soldering, gluing, sewing or stapling, varnishing or coating, machining, preferably drilling, cutting, grinding, riveting or the like, and only having to adjust this fault model to the respective process or the individual processing errors, especially a malfunction of a robot-based tool, in particular, a break-off of the supply welding wire, (carbon fiber) thread, adhesive or coating means, for example, as a result of clogging or a depletion of a supply, the interruption of a welding arc, an impairment or failure of a drill, knife, milling tool, grinding head or the like.

A fault model is defined as an error routine. It can comprise one or several specifications, especially production and/or calculation steps and/or logical branching, which are processed in the event of a fault. This routine can already be programmed and preferably compiled, or it can be the underlying algorithm or more general a structure which defines how to treat an error. In more general terms, a fault model in the sense of the present invention is defined as a model, especially a mathematic, information technical and/or logical model, for error treatment from which the respective behavior in the event of a fault can be derived. In particular, the derivation can comprise a compilation which preferably generates a machine readable code only in the event of a fault. In addition or alternatively that an interpreter of the model can determine what needs to be done. Advantageously, such a general fault model can be configured in a simple manner, preferably without having to program specific routines if all behavior patterns to be considered in the context of the model are covered.

On the one hand, the invention-based setting, configuration and transmission of a fault model can simplify the preparation of a specific fault model, because it is possible to revert to an already existing general fault model which only has to be adjusted individually. Advantageously this can be performed in a simple intuitive manner even by non-experts. Additionally or alternatively it is possible to use a synergy, for example when upon establishing a specific fault model based on the general fault model it is determined that a specific aspect has not yet been provided for. If then this aspect is implemented in the general fault model, it is possible to revert to it when preparing other specific fault models. For example, if when preparing a fault model for a clogged glue gun it is recognized that the glue nozzle should be removed from the tool to avoid dripping, a respective set-down movement can be provided in the general fault model and used when preparing a specific fault model for a clogged spray paint nozzle.

In general, provision has been made of a method or means according to the present invention for controlling a robot arrangement having one or several, especially cooperating robots. The process of controlling or a control system for more compact representation is also defined as a process of adjusting or an adjustment setting among cooperating robots, especially two or more robots, which at least temporarily process, especially guide the same component and/or tool.

In order to control the robot arrangement, one general fault model, respectively, is arranged for one or several groups of different, especially diversified treatment process with respectively predetermined processing errors. In particular, the process of arranging is defined as a process of recreating, similar to a process of providing, for example by means of loading, selecting, imbedding respective models, especially routines, preferably from a library. Each general fault model is provided for an entire group of different treatment processes. In particular, the treatment processes of a group can differ by the type and/or function of robot-based processing tools, robot paths, especially path types, sensor systems, parameter values or the like. In a preferred embodiment, the treatment processes of a group have in common that a robot path is predetermined on which one or several robots of the robot arrangement are moving and processing a component with robot-based tools. For example, robot-based connecting, especially welding, soldering, gluing and/or sewing, robot-based cutting, especially machining such as milling, drilling, sawing, grinding and/or cutting, robot-based coating, especially varnishing and/or robot-based transporting, especially grabbing, joining and the like, can form a group of diversified treatment processes.

For each group one or several processing errors are predetermined, especially abstractly predefined. In particular, a starting error can be predetermined at the beginning of a treatment process and/or a path error while executing the process, because it can be practical to use different fault models.

In particular, a starting error can exist when the treatment process does not start although the starting signal has been triggered, for example, because no release has been issued, a tool has a malfunction or the like. For example, a starting error can exist, when an arc does not ignite, a drill does not reach nominal speed, in the beginning no adhesive is discharged, pneumatic or hydraulic pressure does not build up, a grabber does not open or the like. In a preferred embodiment, a starting error for a running start is predetermined in which at least one robot starts the process with an initial velocity unequal to zero, and/or a starting error for a start with the robot not in motion.

In particular, a path error exists when an unscheduled interruption of the treatment process takes place during path tracking, for example, because the emergency switch has been triggered, a load has been lost or not grabbed, a collision occurred, a partner cooperating with the robot has reported an error, a tool has a malfunction or the like. For example, a path error can exist when an arc is interrupted, a drill gets stuck, no adhesive is discharged, pneumatic or hydraulic pressure drops, a grabber opens unexpectedly or the like.

According to the invention, for one or several specific or concrete processing errors of a process of the group one of the general fault models is configured respectively and transmitted to a control system of the robot arrangement. A transmission or so-called deployment in the sense of the present invention can comprise especially a code generation or generation of a program, in particular, a program module for controlling the robot arrangement, especially a compilation.

In particular, a configuration can comprise a selection of one of several general fault models and/or its parameterization. In particular, values for parameters, for example, a desired repetition number can be predetermined, especially entered or selected. Additionally or alternatively, in a preferred embodiment, it is possible to predetermine or select branches or options in the general fault model, for example, whether a starting error or a path error should be corrected, how to proceed when the error has not been corrected and the like.

In a preferred embodiment, a general fault model comprises a configuration option for an, especially uninterrupted or resumed, continuation on a processing path with or without processing. For example, especially with cooperating robots, it can be practical to continue on the processing path without interruption despite a path error, for example, in the event of an interruption of an arc or the breakage of a sewing thread, so as not to collide with other robots or the component. In a preferred embodiment, during further movement, a "flying" attempt can be made to correct the error, especially a malfunction of a tool, for example to re-ignite the arc. If it works the treatment process on the processing path is continued uninterrupted (interrupted during the process of fixing the malfunction), otherwise without treatment process, for example, in the event of thread breakage.

In a preferred embodiment, a general fault model comprises additionally or alternatively the configuration option of stopping on a processing path. In this way, it is especially possible to configure the above-mentioned "flying" correction of an error. The option of stopping can also be selected especially in order to try to correct the error and to avoid an interruption of the treatment process, for example, a section of the component that has not been welded or not sewn or not varnished.

In a preferred embodiment, a general fault model comprises additionally or alternatively a configuration option of repeating the move of a section of the processing path with or without treatment process after the section has already been passed. When a stop is made on the processing path, the robot or robots can retract a predetermined section, preferably on the processing path with an opposite sense of direction but without treatment process, or even remotely, i.e., not on the processing path, and restart this section when the error has been removed. The section can be processed when the move is resumed, resulting in a processing overlap. For example, it is possible to weld or sew twice in a section in order to guarantee that there is always at least one (welding) seam along the entire processing path. However, when resuming the move, it is also possible to refrain from processing, starting the treatment process after the section has been passed and the move is continued on the path that has not yet been processed. For example, when a glue nozzle or spray paint nozzle is clogged, the processing path can be stopped, the nozzle cleaned and start again prior to the position where the clogging occurred. When passing over the position, processing is started in flying manner in order to avoid an uneven varnish or adhesive layer. Contrary to continuing during a treatment process there will be zero offset of overlap.

Repeating a section of the processing path that has already been passed can be performed on the path or remotely, especially when approaching the processing path. For example, a tool can be lifted off the path and restored to the path about a configurable deposit station before it approaches again the processing path when the processing path starts moving again, while the deposit station is removed, especially in linear manner, and the tool continues moving again on the processing path at or before the place where the treatment process was interrupted.

In a preferred embodiment, a general fault model comprises additionally or alternatively a configuration option of approaching a service station. There the error can be corrected, for example, the cleaning of a nozzle, restocking a supply or exchanging a tool. Afterwards, a point of the processing path that has already been passed over can preferably be approached again remotely, especially directly, and/or—especially on a final section before the point, on the path, i.e., on the processing path. Consequently, after visiting a service station the treatment process can be resumed and continued at the interrupted point or before this point with offset of overlap. In particular, the point can comprise the starting point of the processing path or marked path section, for example, a support point. As a result, in a preferred embodiment, the processing path can be also started from the beginning, especially after a service station has been approached, whereas, as previously mentioned, sections that have already been processed can be processed again, producing, if required, a large overlap, for example, a double (weld) seam. The treatment process can also be started at or shortly before the position at which it has been interrupted in order to avoid or reduce, for example, an uneven varnish, adhesive or grinding depth.

In a preferred embodiment, a general fault model comprises additionally or alternatively a configuration option of an error message. For example, it can be displayed, especially visually and/or acoustically, on the tool, robot, and the control system. For example, as soon as a malfunction of a tool has been determined, a signal can be activated on a tool and/or a display of the control system, which signal can be deactivated after the error has been corrected. Preferably, a respective error message is saved to be able to analyze errors that occurred and were corrected during automated processing.

In particular, when one or several error corrections fail, but optionally immediately when a malfunction occurs, a component can be eliminated, for example, removed by a robot or sorting machine and/or taken away by a conveyor.

In a preferred embodiment, a general fault model comprises additionally or alternatively a configuration option of a tool repair model, especially a tool repair routine, preferably a tool repair motion. For example, a tool repair model can comprise blowing or flushing out a nozzle, for example, a glue or spray paint nozzle, the repeated ignition of an arc, filling a supply, for example, of welding wire, varnish or adhesive, exchanging a tool, for example, a broken or dull drill, or the like. In particular, a tool repair motion can comprise a deposit station of the processing path so as not to damage the component during the repair process. Additionally or alternatively, it can comprise a contacting movement, for example, to clear a frictionally engaged welding gun or nozzle, especially an oscillating tool movement ("scrape pendulum"). In a preferred embodiment, the fault model comprises a configuration option for predetermining geometry velocity and/or other parameters of such a tool repair motion, for example a number and/or amplitude of pendular movements, a direction and/or dimensions of a deposit station of the processing path or the like.

In a preferred embodiment, a general fault model comprises additionally or alternatively a configuration option of a maximum repetition number and/or correction time for correcting an error. Preferably, one or several previously mentioned tool repair models or other error correction models, especially routines, are repeated several times, until the error is corrected or a maximum repetition number and/or correction time has been reached. Then a different error correction model, especially a different error correction routine, can follow to eliminate the component or stop the treatment.

In a preferred embodiment, a general fault model comprises additionally or alternatively a configuration option for a robot arrangement having at least two cooperating robots. As previously mentioned, it can be practical especially with cooperating robots to continue a processing path despite a malfunction. In order to guarantee that even untrained users can perform this process a configuration option can depend on a cooperation of robots. In particular, specific configuration options, for example, the specification of stopping on the path can be automatically restricted, especially inhibited, depending on a cooperation of robots.

In general, in a preferred embodiment, a configuration option can additionally or alternatively depend on a processing error and/or a subsequent model, in particular a subsequent routine. For example, for specific processing errors predetermined by the user when configuring the fault model only specific subsequent models, especially subsequent routines, and/or specific non-configurable subsequent models, especially subsequent routines, can be selected. For example, in the event of thread breakage continuation under a treatment process can be excluded, i.e., non-configurable, in order to avoid sewing empty. Conversely stopping can be non-configurable when varnishing in order to avoid dripping on the component. In a preferred embodiment, only configurable subsequent models, especially routines, are provided.

In the present invention, a subsequent model, especially a subsequent routine involves especially one or several actions of the robot arrangement, especially a movement of one or several robots and/or an actuation of a robot-based tool, for example, a stop, retraction on the processing path, approach of a service station, scratch oscillation, flushing out a nozzle or igniting an arc and the like. Such subsequent models can be linked with a processing error and/or a failure of a correction. For example, a subsequent model can be logically linked to a recorded error, especially respective inputs of the control system, so that the control system of this subsequent model performs especially robot movement(s) and/or tool actuations, when predetermined values are available at the inputs. Such a link and such a subsequent model can form a fault model in the sense of the present invention. In general, a subsequent model can be or comprise especially a subsequent routine, whereas generally speaking a subsequent model can be or comprise especially a fault model as previously described.

In a preferred embodiment, one or several subsequent models are linked to a fault model in such a way that the process is continued with a following subsequent model when the previous subsequent model was not able to correct the error, i.e., the correction has failed. In particular, it can be provided that for maximally one predetermined number or correction time a preceding subsequent model is completed, and the next subsequent model is used when the maximum number or correction time is reached without the error being corrected. For example, it can be provided that a maximum of five ignition attempts are performed, i.e., a preceding subsequent model in the form of an actuation of the tool welding gun, and when an arc fails to appear, i.e., correction has failed, a service station is approached as the following subsequent model.

To determine the occurrence of an error to which a subsequent model is linked, or to determine the failure of a correction, i.e., the continuation or persistence of an error, in a preferred embodiment a general fault model comprises a configuration option of fault detection. In particular, it is possible to predetermine one or several inputs, threshold values for detection values transmitted to the inputs by recording devices, such as sensors, and/or links of such inputs. For example, it is possible to link one input to an adhesive flow sensor and a subsequent routine for correcting the clogging of a glue gun nozzle.

In a preferred embodiment, the establishment and/or configuration of a fault model is graphic-based, especially in that a user selects graphically displayed menu items, for example by clicking or tapping, parameterizing them through numeric input, deferment of virtual actuators or the like.

Further advantages and characteristics are included in the sub-claims and the embodiments. This is shown, partly schematized, in the only FIGURE:

FIG. 1: a means and a method according to an embodiment of the present invention.

In an embodiment the user would like to configure repeated flying ignitions to be used as a fault model, especially an error routine, for interrupting an arc during robot-based welding.

FIG. 1 shows a means for establishing a general fault model 1 for a group of different treatment processes with predetermined processing errors in the form of several data objects, one of which (marked by a border in FIG. 1) is selected in one step S1 by the user, for example, by clicking or tapping.

Subsequently, by entering respective flags, this selected fault model is further configured to an individual fault model 1' for a specific processing error of a process of the group. In the embodiment, the user indicates by setting a "No" ("N") flag that it involves a treatment process of cooperating robots (FIG. 1: "TEAM: N"). The objective is not to correct a starting error (FIG. 1: "START: N"), but a path error in the course of completing the process (FIG. 1: "PATH: J").

As demonstrated by a comparison of the general and the selected fault model and through setting the path error flag further configured fault model 1', further configuration options are provided by selecting a path error routine (FIG. 1: "PATH: J"). Now the user can select whether he wants to stop in the event of an error (FIG. 1: "STOP: N"). In addition he configures a fault detection by providing as relevant input a sensor which monitors the arc (FIG. 1: "E/A: arc"). As subsequent model, especially subsequent routine, he links on this input a repeated ignition with an error message (FIG. 1: "PROC: ignition") and provides for this subsequent routine to be repeated a maximum of 5 times (FIG. 1: "REP: 5"), provided the fault detection does not determine that the arc is functioning again.

If this correction of a malfunction of the welding fails, i.e., the fault detection determines that the arc is not functioning even after 5 ignition attempts, the user links the subsequent routine "ignition" with a following subsequent model which provides for resuming the processing path from the start after a service station has been visited (FIG. 1: "FAIL: Restart.continue.service").

In this way, the user can simply and intuitively provide with only a few steps a specific desired fault model for a specific error by configuring the general fault model 1. In the embodiment, this error is the interruption of the arc during robot-based welding. Subsequently, in a step S2, this fault model is decoded through a means COMP DEPL for transmitting the configured fault model, especially a configured error routine, to a control system of a robot R, imbedded in the processing program and transmitted to the control system.

Subsequently, a few potential embodiments and aspects of the present invention are described for exemplary reasons.

For example, a starting error, as a result of which the treatment process does not start or cannot be started, can exist when a robot-based tool does not respond, an arc will not ignite, a drill does not turn, a laser does not illuminate, an adhesive does not discharge, a pressure cannot be built up or a grabber does not open. In particular, such an error can occur when the process is to start at a certain point on the path and the respective command has also been given appropriately. A distinction can be made between starting in flying manner, i.e., with moving robots, or in idle position.

For example, a path error, as a result of which path tracking experiences an unscheduled interruption can exist when a thread breaks or an arc is interrupted, glue or varnish is empty, the cooling system fails, an emergency switch is activated or a useful load has been lost, unexpectedly nothing was grabbed, a collision occurred or a Robo-Team Partner reported an error.

In the event of a starting error, a help procedure can be called 0 to N times and then the process can be cancelled. In the context of the help procedure an attempt can be made to correct the error, for example through scratch oscillation during a welding process. When this is not sufficient, it is possible to approach a service station.

In the event of a path error, it is possible to continue without stopping ("flying correction"). The correction procedure should not just take any length of time and should not be repeated arbitrarily. When the error cannot be corrected, it is indicated whether a follow-up strategy is required, whether the entire process at the component will be discontinued or the next process path started. For example, in this way a maximum of 5 "flying" ignition attempts can be made when during a path welding process the arc is interrupted.

Path errors can also be corrected by stopping and restarting so as to continue the treatment process, especially with an offset of overlap. For this purpose the tool can be stopped as quickly as possible. The correction procedure is activated immediately after detecting the error. When the error is corrected, the treatment process can be continued at the same position (offset of overlap=0). If it is not possible to correct the error, it is indicated, whether a follow-up strategy is required, whether the entire process at the component will be discontinued or the next process path started. When an error correction failed during path tracking, for example an arc did not ignite fast enough, scratch oscillation takes place on the spot. When in a different treatment process compressed air fails for a polishing tool, the process is stopped and continued when the medium is again available. In the same manner, it is possible with an offset of overlap>0 to retract the tool on the path to the point of failure and beyond in order to achieve an overlap in relation to the error position. The overlap can occur at a predetermined distance offset to the original path. This distance is reduced within the overlap. For example, when an arc has been interrupted during path tracking, the robot moves back on the path 70 mm and is lifted 3 mm off the path. The process is restarted 70 mm before the error position and the offset successively reduced from 3 auf 0 mm.

When a service-station is approached, the path can be resumed at a specific position with an overlap in relation to the error position. This overlap can occur also in a predetermined distance offset to the original path. The distance offset is reduced at the error position on the overlap length. For example, when a welding wire runs out, glue is empty, a spot-welding cover is worn out, the robot must move to the service position, in order to correct the error.

After an error, the processing path can be moved to the end without performing the process. It can be configured to continue moving when an error occurs without attempting to correct the error, or this strategy can join other failed attempts.

Preferably, after reaching the end of the path, it is completely restarted from its beginning, i.e., the robot moves on the path or on a separate retraction path back to the start of the path. Optionally it is possible to approach a service station at the end of the path.

At a restart, processing can be started completely new and, consequently, performed twice up until the error. For example, when the thread of the robot-based sewing machine breaks, the robot continues to move "approaching" to the end without thread, because the movement cannot be interrupted, since the synchronization of needle and robot movement cannot be interrupted without causing problems. Subsequently, the needle is threaded again at a service station, the robot returns to the beginning of the path and the seam is sewn again. This results in a double seam up until the error.

The process can also be continued at an error position, especially it can be started with an overlap in relation to the error position, so that at the second passage except for the overlap only the defective part of the processing path is treated. For example, when during the path the glue of a gluing application runs out, the path has to be moved until its end, when it is not guaranteed that the service station can be approached securely at any position on the path. Only afterwards it is possible to approach the service station and refill the glue and to ventilate. Subsequently, the path is restarted with a distance offset and with an overlap in relation to the error position glue is added at the error position and the distance offset on the overlap length is reduced.

When an error occurs with one of several cooperating robots, the other robots can initially continue to work without being affected. Only when the flying measures fail, the entire process is stopped and everything is restarted. Likewise, in the event that a robot fails, all robots can be stopped and the robot causing the error can correct the error before all robots continue working simultaneously.

In a preferred embodiment, the user can predetermine for each error an individual fault detection, which preferably checks with predetermined frequency and when the respective error occurs activates the subsequent routine.

In particular, the configuration of approaching a service station can comprise the parameter or configuration of error correction routines to be performed at the service station. For example, if the user uses a welding gun on his paths, preferably he can also predetermine the measures, especially movements and/or actuations that have to be performed at the service station in order to correct potential errors, for example, cutting welding wire to length, removing scaling, threading new wire and cutting it to length.

REFERENCE LIST 1 (Means for arranging) general fault model(s)
1' Means for configuring/configured fault model
R Robot

The invention claimed is:

1. Method for controlling a robot arrangement having at least one robot, comprising the steps of:
   arranging by a computer at least a general fault model for a plurality of different treatment processes with predetermined processing errors of a robot-based tool;
   configuring by the computer the fault model for at least a specific processing error of one of the plurality of treatment processes;
   transmitting by the computer the configured fault model to a control system of the robot arrangement; and
   controlling the robot arrangement with the control system in accordance with the fault model while checking for the occurrence of errors at a predetermined frequency.

2. The method according to claim 1, wherein at least one of the predetermined processing errors comprises a starting error at the start of a treatment process or a path error while executing the process.

3. The method according to claim 1, wherein at least one of the predetermined processing errors comprises a malfunction of a robot-based tool.

4. The method according to claim 1, wherein the general fault model comprises a configuration option of at least one of:
   continuing on a processing path with or without processing,
   stopping on a processing path,
   restarting on the path or remotely of a point of a processing path that has already been passed,
   restarting a section of a processing path that has already been passed with or without processing,
   approaching a service station,
   an error message, or
   eliminating a component.

5. The method according to claim 4, wherein restarting the section of the processing path that has already been passed can be performed on the path or remotely.

6. The method according to claim 5, wherein restarting the section of the processing path that has already been passed is performed when approaching the processing path.

7. The method according to claim 1, wherein the general fault model comprises a configuration option of a tool repair model.

8. The method according to claim 7, wherein the general fault model comprises a configuration option of a tool repair motion.

9. The method according to claim 1, wherein the general fault model comprises at least one of a configuration option of a maximum repetition number or correction time for correcting an error.

10. The method according to claim 1, wherein the general fault model comprises a configuration option for a robot arrangement having at least two cooperating robots.

11. The method according to claim 1, wherein the general fault model comprises a configuration option having at least one of:
    a fault detection,
    a subsequent model, or
    a link between a processing error or failure of correction and a subsequent model.

12. The method according to claim 1, wherein at least one of the arrangement or configuration of the fault model is graphic-based.

13. The method according to claim 1, wherein a configuration option depends on at least one of a cooperation of robots, a processing error, or a subsequent model.

14. A system for controlling a robot arrangement, comprising:
    at least one robot operating under the control of a control system and having at least one robot-based tool; and
    a program code stored in a non-transitory storage medium of a computer and, when executed by the computer, causing the computer to:
    establish at least a general model for a plurality of different treatment processes with predetermined processing errors of the at least one robot-based tool;
    configure the fault model for at least one specific processing error of one of the plurality of treatment processes; and
    transmit the configured fault model to the control system of the at least one robot;
    wherein the control system controls the at least one robot in accordance with the fault model while checking for the occurrence of errors at a predetermined frequency.

* * * * *